March 12, 1968     J. D. GRIFFITH     3,372,906
SMALL VOLUMETRIC FLOW REACTION TURBINE
Filed June 22, 1965     2 Sheets-Sheet 1
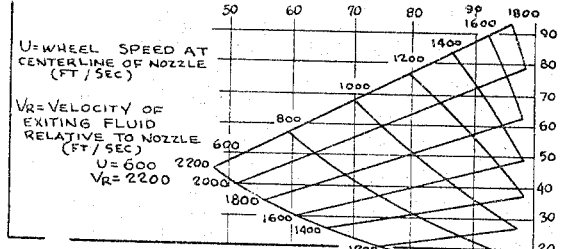
Fig. 5
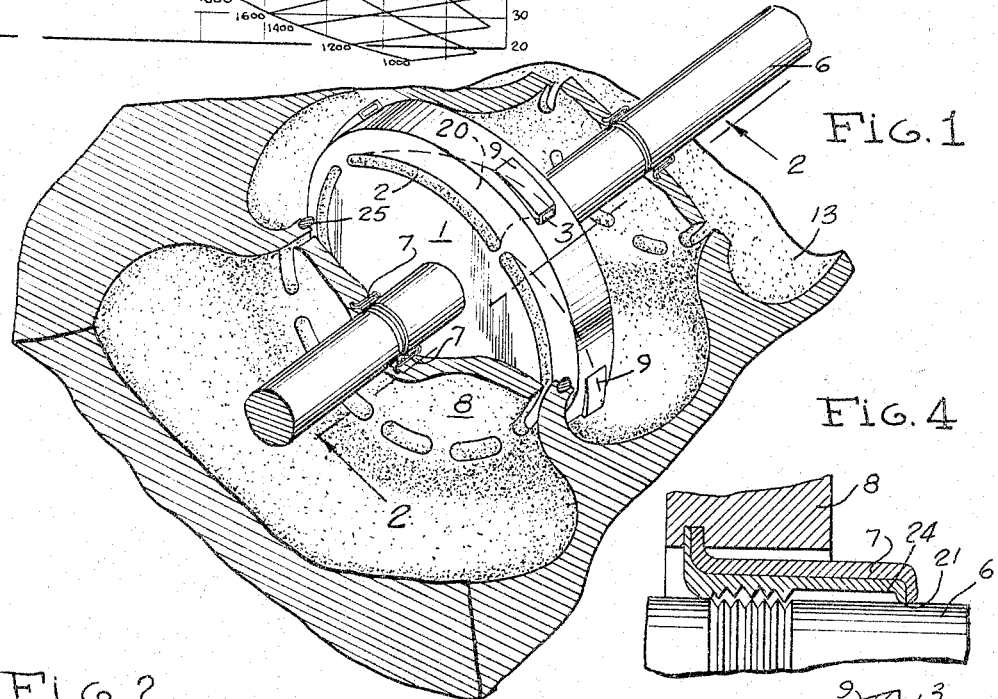
Fig. 1
Fig. 4
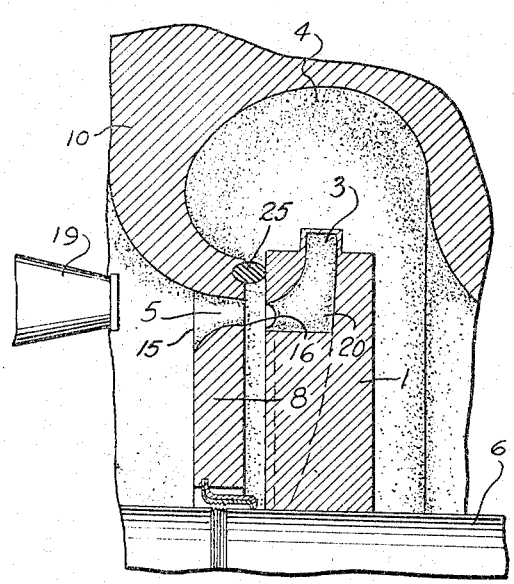
Fig. 2
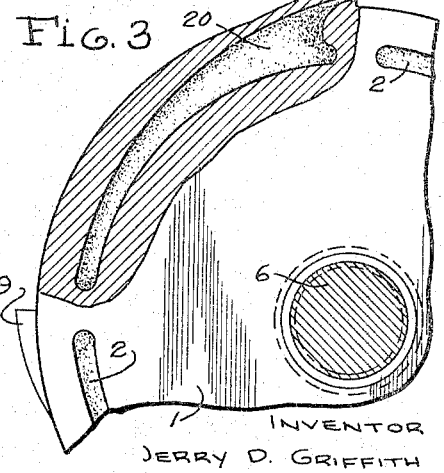
Fig. 3
INVENTOR
JERRY D. GRIFFITH
BY William G. Gapczynski
ATTORNEY

United States Patent Office 3,372,906
Patented Mar. 12, 1968

3,372,906
SMALL VOLUMETRIC FLOW REACTION TURBINE
Jerry D. Griffith, 1001 Rockville Pike, Rockville, Md. 20852
Filed June 22, 1965, Ser. No. 466,133
7 Claims. (Cl. 253—39)

ABSTRACT OF THE DISCLOSURE

This invention relates to reaction turbines and more particularly to a small volumetric flow, small power, high speed reaction turbine capable of operating on high temperature and high pressure fluids at relatively high efficiencies.

---

This invention may be manufactured and used by or for the Government for governmental purposes without the payment to us of any royalty thereon.

BACKGROUND OF THE INVENTION

1. Field of the invention

This invention relates to a single or multiple stage small volume, small power, high speed reaction turbine having a unique tangentially driven rotor, a scroll casing collection chamber, and a seal for equalizing the pressure between stages.

2. Description of the prior art

As is commonly known in the turbomachinery art, conventional bladed-rotor turbines, which operate at substantial power levels, use large diameter wheels with relatively long blades to provide the flow area required for large flow rates. Because of the large wheel diameters of high power conventional turbines, the turbine blades are nearly parallel and consequently the blade velocity and fluid entrance velocity are matched over a large portion of blade length. This velocity matching significantly increases operating efficiencies.

Another factor which increases the efficiencies of large power turbines is the relatively small bypass flow between the blade tips and casing and between the rotor shaft and the inner diameter of the stator sections. The significance of the bypass flow depends on the relative amount of fluid leaked, that is, the ratio of bypass flow to the main flow or the percent bypass. In large power turbines, where the main flow is large compared to the bypass flow, percent bypass is small and thus leakage has little effect on efficiency.

Small power conventional turbines, on the other hand, have poor velocity matching and a high percent bypass which reduce operating efficiencies to an undesirable level. As power is reduced, the required volumetric flow rate decreases in direct proportion at a given pressure ratio, fluid inlet condition, and speed. With a smaller flow rate, the main flow area must be reduced, for example, by decreasing blade lengths. Since the clearance area between rotating and stationary members decreases proportionally much less than the main flow area and flow rate, the percent bypass increases. This increase in the relative amount of fluid lost through leakage decreases operating efficiency markedly.

One way to improve the efficiency of small power turbines is to reduce wheel diameter, lengthen blades and increase rotational speed to maintain peripheral speed. These measures would increase flow area and reduce percent bypass but would create problems with respect to velocity matching. When the wheel diameter is reduced, the blades become less parallel and, except for one area on the blades, the fluid entrance velocity ceases to match the blade velocities. This velocity mismatch decreases efficiency. Thus, in conventional small power turbines which have a high percent bypass, it has not been feasible to reduce percent bypass without creating the adverse effect of velocity mismatching.

Another factor affecting conventional small power turbine efficiency is that the frictional pressure drop occurring in the rotor blade and stator vane passages does not vary directly with flow area or flow rate. At low power levels and low volumetric flow rates the frictional pressure drop has a more significant effect on efficiency than at high power levels. Further, while it is becoming increasingly more common to employ high enthalpy fluids such as supercritical steam in large power turbines, there are severe restrictions on such use at low power levels where efficiency is lowered by reduced volumetric flow rates. For a given power output and at a given initial efficiency, the volumetric flow rate decreases directly with the increase in energy per unit volume of fluid. At higher temperature and pressure the working fluid transports more energy per unit volume or mass than at lower temperature and pressure. Consequently, conventional small power turbines operate at a lower efficiency on high enthalpy fluids because of the resulting lower flow rates. These factors and those discussed above have heretofore made it impossible to construct a small power turbine having an efficiency commensurate with that of large power turbines.

SUMMARY

This invention comprises the unique combination of a continuous, toroidal, converging fluid passageway through the turbine stator and rotor, directing fluid axially and radially upwardly to a tangential exhaust from the rotor. The fluid exhaust is then collected and directed axially and radially inwardly to the next stage. A bi-metallic seal is also disclosed which selectively allows fluid to bypass the rotor to equalize pressure for optimum operation characteristics.

Accordingly, it is an object of this invention to provide a turbine which is capable of operating at a relatively high efficiency in the low power range as well as the high power range.

Another object is to provide a turbine which is capable of utilizing high enthalpy working fluids without adversely lowering efficiency.

Another object is to provide a small-diameter, bladeless turbine rotor which operates at a high rotational speed and is compact and lightweight.

Further objectives and advantages will become apparent from the following description and associated drawings.

Brief description of the drawings

FIG. 1 is a perspective view of an embodiment of this invention, with portions of the casing being broken away to show the interior of one stage of a multi-stage turbine;

FIG. 2 is a partial center cross sectional view taken on the line 2—2 of the turbine shown in FIG. 1;

FIG. 3 is an elevation view of the turbine rotor, partly broken away to show one interior fluid passageway;

FIG. 4 is a detailed sectional view of the seal shown in FIG. 2; and

FIG. 5 is a turbine map indicating the ideal stage efficiency as a function of the energy extracted per stage.

DESCRIPTION OF THE PREFERRED EMBODIMENTS

Figure 6:
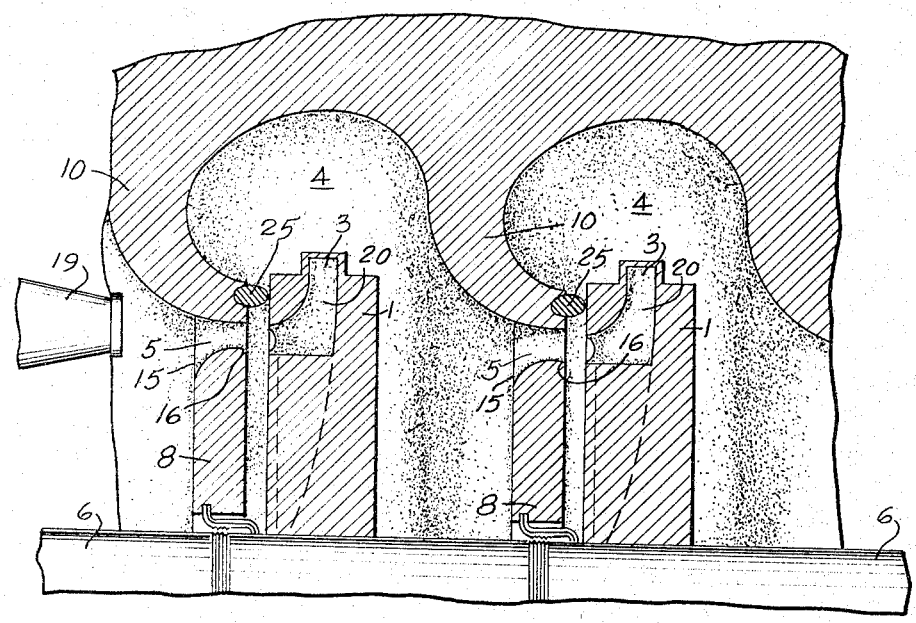
FIG. 6 is a partial cross-sectional view of two stages of a multi-stage turbine, adding a second stage to the single stage shown in FIG. 2.

Referring to the drawings, FIGS. 1 and 2 illustrate one stage of a multiple stage turbine incorporating this invention. Disc-shaped rotor 1 is formed integrally on a cylindrical main rotor shaft 6 which runs horizontally through the turbine assembly. Casing 10 completely surrounds shaft 6 and rotor 1. Hollowed from the inside of casing 10 are fluid collection chambers 4 and 13 which are preferably but not necessarily toroidal-shaped and which are, in this embodiment, located immediately adjacent the peripheries of the rotors. Between the rotors is a stator section comprising stator vanes 5 and interstage extension 8. Extension 8 is supported by vanes 5 which in turn are fitted to and supported by casing 10. Stator vanes 5 are relatively wide at leading edges 15, where they join collection chamber 4 facing in a nearly axial direction. As vanes 5 proceed in an axial direction through the stator, they narrow, curve towards a direction transverse to the casing, and then terminate at trailing edges 16. Trailing edge 16 is positioned directly in line with annularly-shaped nozzle inlet plenum chamber 2 hollowed from rotor 1. Projecting radially from the rims of rotor 1 are equally spaced, relatively short nozzle housings 9. There may be any number of housings 9, preferably four, and, if desired, housings 9 could extend from the sides of rotor 1 to communicate with chamber 4, suitably located. The external surfaces of housings 9 are shaped to blend with the rims of the rotors to produce a minimum of aerodynamic drag. The rear faces of the housings lie in a plane substantially perpendicular to the periphery of the rotor and contain nozzle exit openings 3. The cavity 20 within rotor 1 communicates directly with chamber 2, and the cross sectional area of cavity 20 becomes increasingly smaller in the direction of opening 3. Thus, cavity 20 serves as a convergent nozzle, the exit centerline of which is substantially tangent, in this embodiment, to the periphery of the rotor. The mating of the internal surfaces of cavity 20 and chamber 2 forms a smooth transition between the cavity and the chamber. Casing 10 is split on a horizontal plane, as shown to allow easy assembly of the unit. The two casing halves are held together by bolts which pass through a flange on the upper casing half and into a flange on the lower casing half. Main rotor shaft 6 is supported by conventional journal bearings. These bearings and a conventional throttle valve which controls steam input are not shown.

Seal member 7 reduces fluid leakage between regions of different pressure. The seal is preferably bi-metallic, constructed in a conventional manner, preferably but not necessarily made of 347 stainless steel over Inconel 600 steel, and is conventionally attached to extension 8, for example, by welding, brazing, or riveting. The metal references refer to the standard American Materials Society designations. The metals chosen take into consideration factors such as coefficient of expansion and temperature and corrosion resistance. The particular metals to be used is an engineering choice.

Seal 7, and rotor shaft 6 are serrated as shown in FIG. 4. When seal 7 is in place, the serrations of the seal and the rotor shaft are intermeshed, just out of contact. Flanges 21 are formed at the distal end of seal 7 thereby creating chamber 24. During startup conditions there is a substantial bypass of fluid through seal 7 between areas of high and low pressure, since the only impediment to flow is the tortuous path of flow through the serrated areas. During operation, the turbine heat causes the bi-metallic elements of the seal to expand at different rates to cause flange 21 to move toward rotor 6. This movement effectively restricts bypass flow. As the bypass flow is restricted the pressure in chamber 24 becomes approximately equal to the high pressure upstream from the seal. With such pressure within chamber 24, the internal force bowing flanges 21 toward rotor 6 is partially overcome and flange 21 moves away from the rotor. This movement allows more bypass flow which causes an increase in velocity through the serrations of the seal and a corresponding pressure drop within chamber 24. It is thus apparent that the bi-metallic elements and leverage of seal 7 can be designed to establish an equilibrium condition wherein enough bypass flow is permitted to keep flange 21 just out of contact with rotor 6. This design prevents excessive seal wear while reducing bypass flow to acceptable levels. The specific seal dimensions and construction depend in part on materials used, operating temperature, length of seal, and turbine design. Each seal is preferably emperically designed to fit its specific use and environment. Seal 25, shown in FIG. 2, prevents bypass of fluid between the casing and rotor projections. This seal may be conventional, as shown, or it may be a bi-metallic seal such as seal 7.

During normal operation, a working fluid, such as steam at low temperature and pressure or supercritical steam at high temperature and pressure, passes through a conventional throttle valve 19 and enters the turbine through inlet guide vanes 5 which direct the flow through the first stage stator to the first stage rotor. The fluid then passes axially and at an inclination transverse to the casing into the inlet plenum 2, turns and flows radially into the nozzle housings 9. In passing through the first nozzle, the fluid undergoes an expansion and pressure drop and exits opening 3 at a very high, but slightly subsonic, velocity tangential to the rotor periphery. The reaction on the nozzles by the exiting fluid produces a torque which causes a rotation of the rotor. Upon discharge from the nozzles to the collection chamber 4, the fluid loses much of its velocity head. Stator vanes 5, which may vary in number and spacing from that shown in FIG. 4, accept, redirect, and accelerate the fluid axially and slightly inward to the following rotor stage where the above described process is repeated at a lower pressure. In the case of very low power, single stage units, collection chamber 4 would serve as an exit plenum which would lead directly to an opening to the exterior of the turbine.

Startup of the turbine is the same as with conventional turbomachinery. After the turbine is brought to full operating speed, working fluid is admitted through a throttle valve as the load is accepted. Shutdown is accomplished by reversing the sequence of events. The throttle valve is closed as load is removed from the turbine, and normal operating speed is maintained until substantially all of the load is removed. Complete closing of the throttle valve then terminates the input of fluid and the turbine coasts to a shutdown. Changes in the load on the turbine during operation actuate a conventional governor which in turn alters the throttle valve opening and thus alters the volumetric flow rate to meet the requirements of the load.

It is apparent from the above discussion that the turbine of this invention does not have the inherent limitations of the conventional turbine with respect to velocity matching and percent bypass. Because there are no bladed rotors there are no significant problems in matching the fluid velocity with the velocity of the rotor at the points where momentum transfer occurs. The energy losses inherent in the embodiment of this invention arise from the energy required to change the direction of the fluid in the fluid passages and from nozzle losses, both of which are relatively small. The percent bypass is reduced by seal members 7. Percent bypass is further reduced by the small diameter, high speed, light weight, compact, and essentially solid rotor assembly of this invention. By using a smaller diameter wheel the clearance area through which fluid can escape is reduced proportionally to the radius, even though the clearance tolerance is substantially unchanged. The reduction of percent bypass and elimination of velocity mismatching enables this turbine to operate at relatively high efficiencies at either high or low power levels and with high or low enthalpy fluids.

The ideal efficiency of the turbine of this invention is reduced because of its inability to recover the velocity head exiting from the nozzles. However, this loss is not severe. FIG. 5 is an ideal turbine map which accounts for this loss. It is apparent from this map that substantial energy extraction per stage, approximately 60 B.t.u. per pound for steam, is possible at efficiencies above 90 percent. While this turbine has an ideal efficiency which is less than the almost 100 percent efficiency of a conventionally designed turbine, it is possible to obtain a greater percentage of this basic efficiency in our more compact design which is not severely limited by volumetric flow considerations.

I claim:
1. A fluid reaction turbine engine comprising:
   (a) a rotor shaft;
   (b) a plurality of annular rotor projections integrally extending from said rotor shaft;
   (c) a casing rotatably mounting said rotor shaft;
   (d) a plurality of stator projections extending from said casing and alternatingly disposed with said rotor projections;
   (e) a plurality of nozzles extending integrally from each of said rotor projections;
   (f) means for controllably admitting fluid to the first of said nozzles;
   (g) an annular scroll collection chamber surrounding each of said rotor projections and communicating with said nozzles, said chamber collecting said fluid as it exhausts from said first nozzles and accelerating and directing said fluid generally radially inwardly and axially through passageways in one of said stator projections to passageways hollowed from the interior of one of said rotor projections;
   (h) means for accelerating and directing said fluid generally axially and radially outwardly, disposed interiorly of said rotor projections, said means directing said fluid through said nozzles and exhausting said fluid from said rotor projections generally tangenial to the periphery of said rotors providing a reactive turning force to said rotor; and
   (i) means for exhausting said fluid from said turbine.

2. The fluid reaction turbine described in claim 1 wherein the means described in subparagraphs (g) and (h) comprise the sides of toroidal converging passageways extending from a collection chamber adjacent said first nozzle axially and inwardly through said stator projection to one of said rotor projections where said passageways communicate with outwardly directed toroidal converging passageways hollowed from said rotor projection, said rotor passageways further directing said fluid generally tangential to the periphery of said rotor projections where it is exhausted from said nozzles.

3. The fluid reaction turbine of claim 1 further comprising means for substantially sealing the clearance spaces between said stator projections and said rotor shaft and rotor projections against the leakage of fluid between areas of higher and lower pressures.

4. The fluid reaction turbine of claim 1 wherein the nozzles of subparagraph (e) are aerodynamically streamlined to reduce drag, the discharge ends of said nozzles extending beyond a surface of said rotor projections and said nozzles being tapered from said discharge ends to a smooth intersection with said rotor projections at the leading edge of the nozzles.

5. The fluid reaction turbine of claim 3 wherein said sealing means comprise bi-metallic seals attached to stationary parts of said turbine and being cantilevered in the direction of lower pressure, said bi-metallic elements having different rates of heat expansion so that when the seals are heated the distal ends of the seals move to form a fluid seal between the areas of higher and lower pressure.

6. The fluid reaction turbine of claim 5 wherein the distal ends of said bi-metallic seals are minutely spaced from said rotor shaft during normal turbine operation, wherein said bi-metallic seals are serrated, and wherein said rotor shaft is serrated, the serrations of seals and rotor shaft being slightly spaced from one another to form a tortuous fluid passageway through the serrations, the flow of fluid through the serrations reducing the pressure between the serrated area of said seals and the distal ends of said seals to prevent pressure between the serrations and distal ends from increasing the spacing between said distal ends and said rotor shaft.

7. A fluid reaction turbine engine comprising:
   (a) a rotor shaft;
   (b) at least one annular substantially solid rotor projection integrally extending from said rotor shaft, said rotor projection having a plurality of converging, outwardly directed, toroidal, fluid passageways hollowed from the interior thereof;
   (c) a casing rotatably mounting said rotor, said casing having an annular collection chamber surrounding and contiguous with the periphery of said annular rotor projection;
   (d) at least one stator projection extending from said casing and having fluid passageways hollowed from its interior, the outlet of each of said stator fluid passageways communicating with the annular collection chamber hollowed from said casing and with the inlets of the fluid passageways hollowed from said rotor projection;
   (e) a plurality of nozzles extending integrally from the periphery of said rotor projection, said nozzles defining openings which communicate with the fluid passageways hollowed from said rotor projection and with said annular collection chamber hollowed from said casing, the fluid passageways through said stator projection communicating with the passageways in said rotor projection as the rotor rotates to form a continuous, converging passageway directing fluid axially into said rotor projection where said fluid is directed axially and outwardly to said nozzles where said fluid is expelled tangentially to the periphery of said rotor projection into said collection member where the fluid is further directed inwardly and axially, said fluid providing a reactive turning force to said rotor as it exists from said nozzles;
   (f) means for admitting said fluid to said turbine; and
   (g) means for exhausting said axially directed fluid from said turbine.

References Cited

UNITED STATES PATENTS

| 751,316 | 2/1904 | Lindmark | 253—89 |
| 1,945,088 | 1/1934 | Silbermann et al. | 253—91 |
| 2,253,904 | 8/1941 | Haug | 253—77.3 X |
| 2,945,670 | 7/1960 | Caddell | 253—91 X |
| 3,032,988 | 5/1962 | Kleckner | 253—91 X |

FOREIGN PATENTS

| 559,351 | 6/1923 | France. |
| 621,002 | 10/1935 | Germany. |
| 8,854 | 1893 | Great Britain. |
| 347,871 | 5/1931 | Great Britain. |

EVERETTE A. POWELL, Jr., *Primary Examiner.*